United States Patent
Garnier

[15] 3,702,938
[45] Nov. 14, 1972

[54] ELECTRIC GENERATOR DRIVE

[72] Inventor: Henri Louis Garnier, Courbevoie, France

[73] Assignee: Compagnie Francaise des Petroles, Paris, France

[22] Filed: April 16, 1971

[21] Appl. No.: 134,780

[30] Foreign Application Priority Data

April 17, 1970 France...................7013987

[52] U.S. Cl. .....................290/52, 415/70, 415/90, 290/1
[51] Int. Cl. ..............................................H02k 7/18
[58] Field of Search .........415/90, 70, 122; 290/1, 52

[56] References Cited

UNITED STATES PATENTS

| | | | |
|---|---|---|---|
| 2,773,453 | 12/1956 | Gemeinhardt | 415/70 |
| 3,157,793 | 11/1964 | Adkins | 415/90 |
| 2,107,090 | 2/1938 | Swennes | 415/70 |
| 2,759,427 | 8/1956 | Holstein | 415/70 |
| 2,472,010 | 5/1949 | Gilman | 415/122 X |
| 2,956,503 | 10/1960 | Neidl | 415/90 |

FOREIGN PATENTS OR APPLICATIONS 161,412   11/1952   Australia...................415/70

*Primary Examiner*—G. R. Simmons
*Attorney*—Sughrue, Rothwell, Mion, Zinn & Macpeak

[57] ABSTRACT

An electric generator drive device for use at an underwater drilling installation, which uses the kinetic energy of a pressurized fluid coming from the bore hole to drive the generator for supplying electric power to the installation.

The moving fluid escaping from the bore hole is directed into a chamber tangentially to its walls and is evacuated through an axial opening so as to engender a vortex flow that moves a mass attached to a casing which is guided by a shaft that moves to describe a conical movement. The shaft brings about the rotation of an alternator or alternating-current generator, separated from the chamber by a diaphragm and separated from the outside environment by a container filled with oil.

2 Claims, 1 Drawing Figure

PATENTED NOV 14 1972
3,702,938
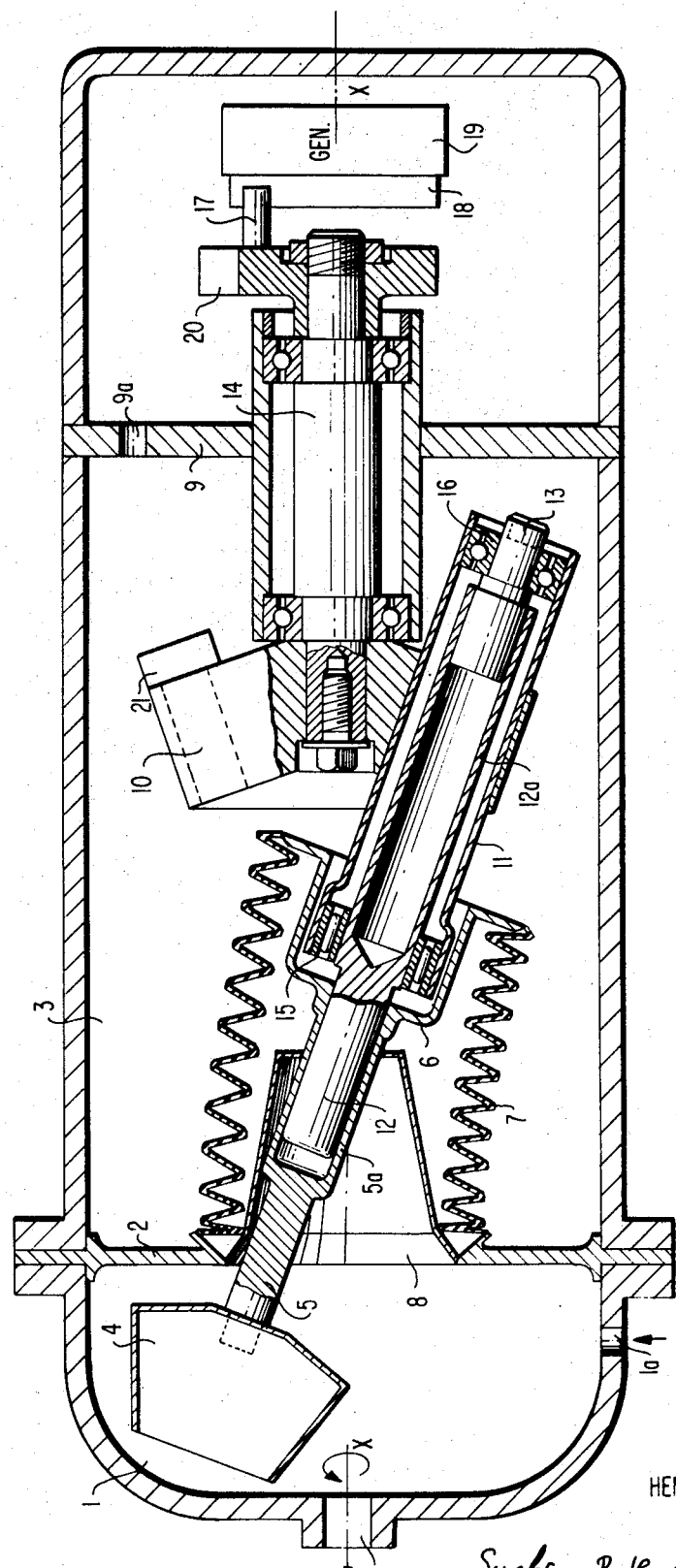
INVENTOR
HENRI LOUIS GARNIER
BY Sughrue, Rothwell, Mion,
Zinn & Macpeak
ATTORNEYS

ELECTRIC GENERATOR DRIVE

BACKGROUND OF THE INVENTION

1. Field of the Invention

The invention relates to an electric generator for supplying electricity to an underwater drilling installation whose cost will be extremely low when compared to known means and whose operation will require practically no maintenance, thus permitting its utilization even in very deep water.

2. Prior Art

The only electric power sources currently available for the purpose of equipping underwater petroleum wells are either power sources on board surface installations, consequently requiring a ship to be stationed at the drilling installation, or the construction of a separate platform having a series of tables, on which are placed autonomous power sources. The latter can be either batteries, whose relatively short lifetime prevents them from being used in deep water, or they can be long-lasting installations, such as atomic energy or engine driven generators. However, these are extremely burdensome and expensive. Thus, so far, it has been impossible to develop underwater petroleum installations in deep water, except in special cases, when it can, for example, be assured of profitable production.

As for hydraulic turbines, which make it possible directly to tranform the kinetic energy of a fluid into the rotation energy of an alternating current generator shaft, no one has, as yet, employed the petroleum which is channeled by a well head as a driving fluid, because the turbine shafts and blades are much too fragile to be moved along by a fluid that could pick up sludge, mud, etc., which, in turn, causes not only their becoming dirty but also their damage and deterioration.

For the use described herein, a device is required that will be both sturdy and tight. It is desired to recover a portion of the kinetic energy of the fluid, for example, in order to drive a small alternator that will furnish electric power for local needs, without being greatly concerned with the energy conversion yield or output.

One of the problems presented is that of tightness which is very difficult to solve, especially with regard to the use visualized herein, since the pressure of the driving fluid may be very high. Thus, a drive mechanism that would utilize a large, rough-type turbine having blades which could be replaced by sturdy pieces and which would transmit its movement directly to a turbine shaft and involving a conventional sealing joint would not suffice.

According to another possible solution, the same turbine could produce the rotation of a first plate, disk, or turntable, which would be connected to a second plate attached to the driven shaft, by a rod articulated by end swivel joints on the two plates, and pivoting around a fixed intermediate point, likewise provided with a swivel joint. This solution is known for a device used in transmitting a rotation movement. However, to guarantee a water-tight seal, this type of drive device requires the use of a bellows which will cover the rod, traversing it and which will follow its movement. This solution is awkward, burdensome, and expensive and is rather delicate to carry out. Moreover, it would not be sturdy enough for the use described herein.

SUMMARY OF THE INVENTION

One advantage of the present invention is that it presents a solution which is completely different from conventional electric generator drives and which is sturdy, while making it possible to perfectly isolate the shafts of the drive turbine and generator from the moving fluid.

In accordance with the present invention, an elastic bellows has a bottom portion which is traversed by an inclined shaft that transmits the rotational movement. The opposite end of the bellows is connected around the opening of the wall of the drive enclosure, thus assuring its tightness. The end of said inclined shaft extending out of the bellows is provided with a casing having bearings positioned within its interior to permit the relative rotation of an extension of the shaft and of the casing. The casing fits into a housing of a piece attached to the end of the shaft to be driven with the entire assembly being so arranged that, when said inclined shaft is subjected to a movement which tends to make it turn around the axis of said shaft, the latter is made to rotate by said casing, while the inclined shaft turns in the casing, with its axis describing a conical surface around the axis of the turbine shaft.

The assembly of the electric power generator device which, according to the present invention, converts the flow of pressurized petroleum into a rotational movement of the alternator shaft through a sealed wall, includes a sealed chamber to receive and evacuate the driving fluid. This chamber imparts a movement to this fluid having a trajectory that will be circular at least in part, with said chamber being provided with an opening for the passage of an intermediate inclined sliding shaft into the chamber.

The intermediate inclined shaft has a movement mass attached to the end thereof and which is placed in the path of the fluid in said chamber. The intermediate shaft passing through said passage opening is connected near its mid-point to a tight sealed sheath which forms one piece with the end of an elastic bellows which has its other end secured around said passage opening. The rotational movement connection is made between the end of the alternator shaft and the end of said intermediate shaft which is opposite the movement mass.

A perfectly tight sealed compensation chamber, containing a fluid that balances the pressure exerted by the moving fluid upon the bellows, is formed on the other side of the bellows, with the intermediate portion of the shaft coming out of the tight sheath. Said connection and at least the portion near the alternator shaft thus driven are positioned in the compensation chamber.

The driven shaft and the power consumption apparatus carried by this shaft, an alternator, for example, are advantageously mounted in a tight housing and the whole assembly is contained in the balancing fluid which, preferably, is oil or a suitable lubricant.

The invention will be better explained and understood with reference to the single FIGURE in the attached drawing, given here by way of non-restrictive example; the details will emerge both from the drawing and from the specifications involved in the invention.

BRIEF DESCRIPTION OF THE DRAWING:

FIGURE 1 is a sectional view of an assembly of the preferred embodiment according to the present invention.

DESCRIPTION OF THE PREFERRED EMBODIMENT

As shown in FIGURE 1, the chamber 1 has the moving fluid supplied thereto from the drill hole at inlet 1a. Chamber 1 is shaped in such a manner as required for imparting an eddy movement to the fluid, preferably a revolution movement around the axis X—X. Chamber 1 is separated by a flat wall 2 from another chamber 3 containing a liquid, for example, oil which has a pressure essentially equal to that of the moving fluid. The driving fluid arrives tangentially in chamber 1 at 1a and comes out of chamber 1 axially at 1b. An eddy or turbulence is thus created and this eddy is used to move a mass 4. The mass 4 is mounted in chamber 1, and is attached to the end of an inclined shaft 5 which is connected to a hollow sheath 6 that is linked to the end of a bellows 7, preferably metallic, whose other end is attached to wall 2, surrounding an axial opening 8 made in this wall. The shaft 5 and bellows 7 are so arranged that, when mass 4 turns, the bellows can follow this rotational movement.

To make the construction lighter and to improve the ways in which it can be dismantled, the end of shaft 5 passing through the sheath 6, is made in several parts, some of which are hollow.

Shaft 5 is connected to sheath 6 by a cylindrical portion 5a. In the latter there is housed a shaft or tube 12 which has its opposite end formed in a tube 12a, where an end piece 13 is placed. Tube 12a is surrounded by a casing 11, which is supported at each end on shaft 12 and on end piece 13 by means of suitable respective bearings 15 and 16. Casing 11 is inserted into a housing or opening of a piece 10 that is mounted to the end of shaft 14 which is to be moved. All of the junctions of the bellows to neighboring pieces are so welded as to assure perfect tightness and complete sealing.

Turbine shaft 14 drives an electric power generator 19 by means of a turning carrier 17 operatively positioned in a groove in a plate 18. The entire drive mechanism is submerged in and washed by the oil that fills chamber 3 and passes freely through a plurality of openings 9a in wall 9.

The operation of the structure according to the present invention will now be described. When mass 4 is driven by the eddy of the driving fluid and performs a circular movement, the axis of the inclined shaft assembly describes a conical revolution surface around axis X—X of shaft 14 which is to be moved, thus rotating piece 10 and, in turn, shaft 14 connected thereto. Shaft 12 with end piece 13 is free to turn inside the casing 11, and bellows 7 following the conical movement of the shaft 5. Masses shown schematically in dotted lines at 20, 21, make it possible to balance the device statically and dynamically.

The present invention thus provides a sturdy and tight sealed drive system which, through shaft 14, can drive an alternating current generator or alternator or a dynamo generator, so that the kinetic energy of the moving fluid which normally would be lost is utilized. It is not necessary to regulate or to pressurize the fluid that fills chamber 3 because this pressure is established automatically. The housing is tightly sealed to compensate for the pressure of the moving fluid in chamber 2.

It is to be pointed out that modifications can be made in the version which has just been described, especially by substituting equivalent technical means, without going beyond the framework of this invention.

It is clear that the device according to the present invention offers several advantages, some of which have already been pointed out above, and, in particular, the absence of delicate mechanical pieces, the possibility of working under heavy pressure from the moving fluid, due to the compensation fluid in chamber 3 which balances this pressure, the possibility of working with any kind of fluid, even nonhomogeneous and erosive fluids, and the absence of a turning joint subject to the moving fluid.

What is claimed is:

1. In a drive mechanism for an electrical power generating apparatus including a first chamber having a tangentially oriented inlet opening for pressurized driving fluid and a central, axial outlet opening for the fluid, the first chamber having a configuration to impart a circular flow to the entering driving fluid which thereafter exits through the central outlet opening, an impeller within the first chamber adapted to be driven by the driving fluid, a shaft attached to the impeller and movably supported near it midpoint for describing a conical surface of revolution when in motion, an electric generator, and a drive shaft attached to the generator at one end and having an enlarged head member on its other end, the axis of the drive shaft being inclined to the axis of the impeller shaft, the improvements comprising:
   a. a second, fluid filled chamber attached to the first chamber and enclosing the generator and its drive shaft,
   b. a common wall separating the first and second chambers and having a central opening through which the impeller shaft projects,
   c. a hollow cavity in the end of the impeller shaft remote from the impeller,
   d. a fluid tight, deformable bellows attached to the end of the impeller shaft surrounding the hollow cavity at one end and to the opening in the common wall at the other end,
   e. a coupling shaft axially aligned with the impeller shaft and journaled at one end within the hollow cavity,
   f. a housing tube secured to the enlarged head member and surrounding and axially aligned with the coupling shaft, and
   g. bearing means at each end of the housing tube journalling the coupling shaft for rotation therein.

2. A drive mechanism according to claim 1, characterized by the fact that said fluid in said second chamber is insulating and lubricating oil.

* * * * *